(12) United States Patent
Hirata et al.

(10) Patent No.: US 8,282,159 B2
(45) Date of Patent: Oct. 9, 2012

(54) ROOF APPARATUS FOR VEHICLE

(75) Inventors: Tetsuya Hirata, Toyota (JP); Masaji Ishikawa, Toyoake (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/064,151

(22) Filed: Mar. 8, 2011

(65) Prior Publication Data

US 2011/0227372 A1    Sep. 22, 2011

(30) Foreign Application Priority Data

Mar. 19, 2010 (JP) ................................. 2010-064334
Sep. 17, 2010 (JP) ................................. 2010-209785

(51) Int. Cl.
 *B60J 7/22* (2006.01)
 *B60J 7/047* (2006.01)
(52) U.S. Cl. ............... 296/217; 296/216.03; 296/216.05
(58) Field of Classification Search ............. 296/216.02–216.05, 217
See application file for complete search history.

(56) References Cited

U.S. PATENT DOCUMENTS

| 4,257,646 | A | | 3/1981 | Schatzler | |
| 4,966,409 | A | * | 10/1990 | Schmidhuber et al. | ........ 296/213 |
| 7,850,230 | B2 | * | 12/2010 | Faerber | ........................ 296/217 |

FOREIGN PATENT DOCUMENTS

| JP | 55-87621 | 7/1980 |
| JP | 2000-190735 | 7/2000 |
| JP | 2002-274182 | 9/2002 |

\* cited by examiner

*Primary Examiner* — Dennis Pedder
(74) *Attorney, Agent, or Firm* — Finnegan, Henderson, Farabow, Garrett & Dunner, LLP

(57) ABSTRACT

A roof apparatus for a vehicle includes a guide member sliding along a guide rail, a support member supporting a movable panel, a drive member driving the movable panel and the guide member, a first garnish supported by the guide rail and covering a clearance between the support member and the guide rail from an interior space of the vehicle under tilt-up and opening operations of the movable panel, a second garnish supported by the movable panel and covering the support member from the interior space, the second garnish covering the guide member under a fully closed state and the tilt-up operation of the movable panel; and a third garnish connected to the guide member or the support member and covering an opening portion between the first and second garnishes from the interior space under the tilt-up and opening operations and the fully closed state of the movable panel.

20 Claims, 9 Drawing Sheets

FIG.1A
FIG.1B
FIG.1C
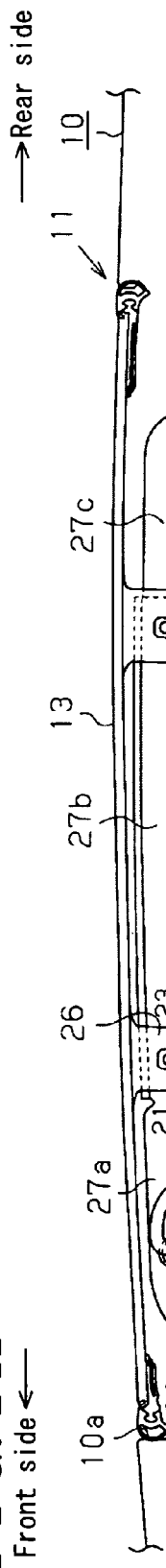
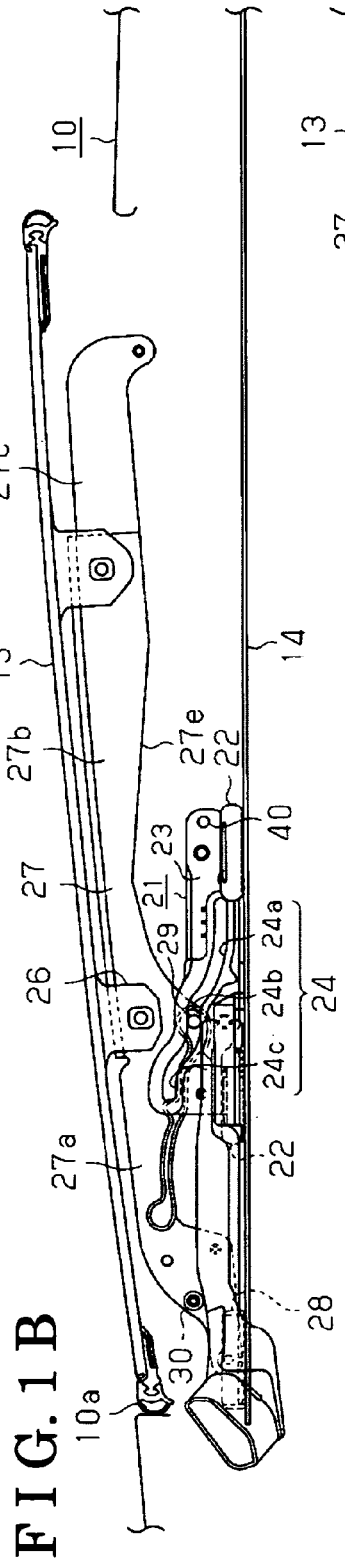
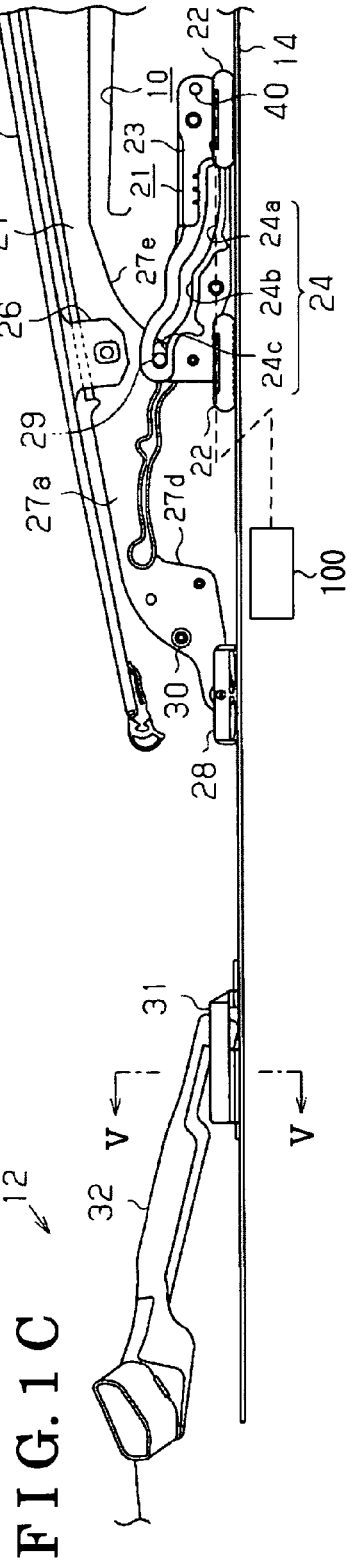

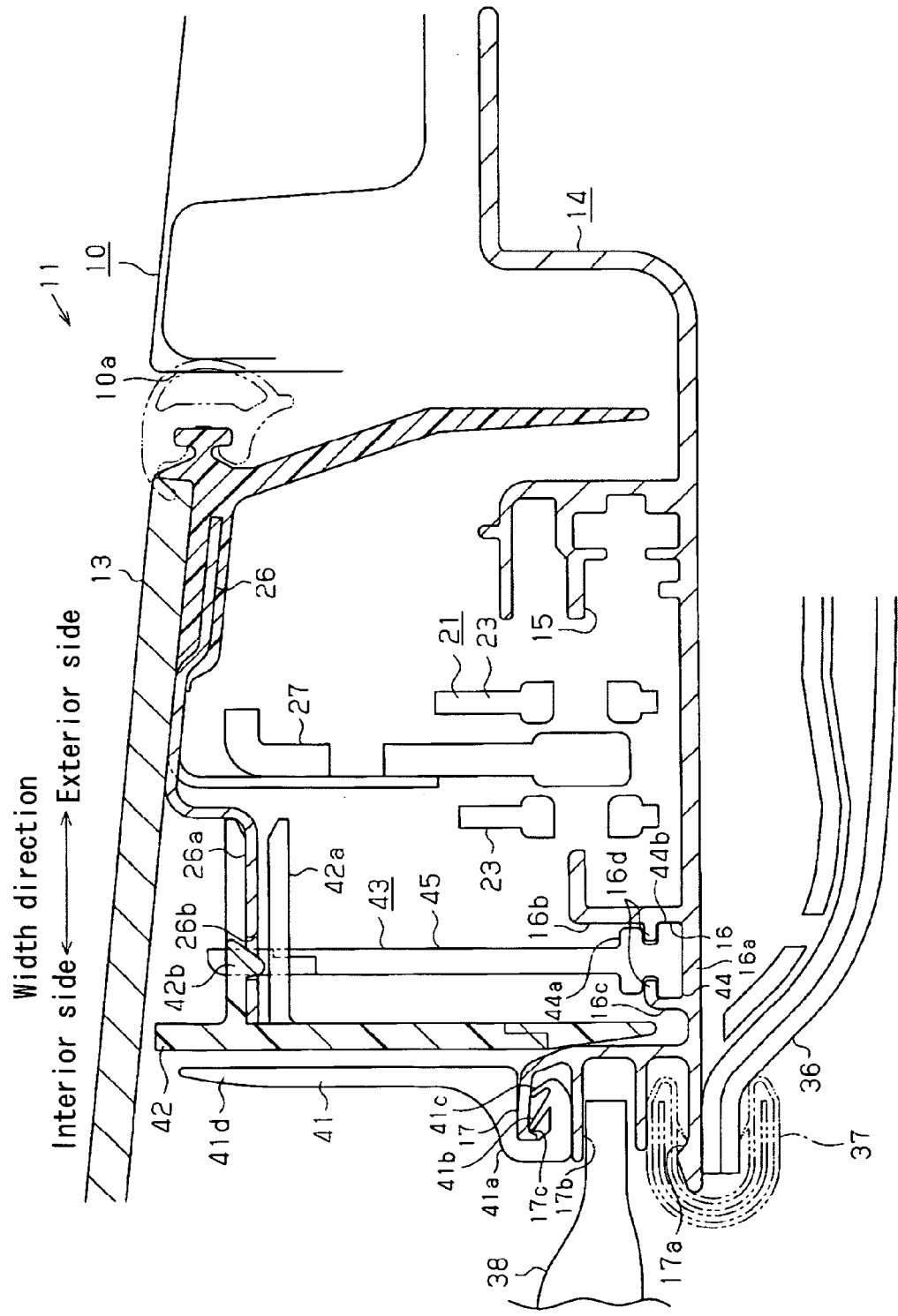

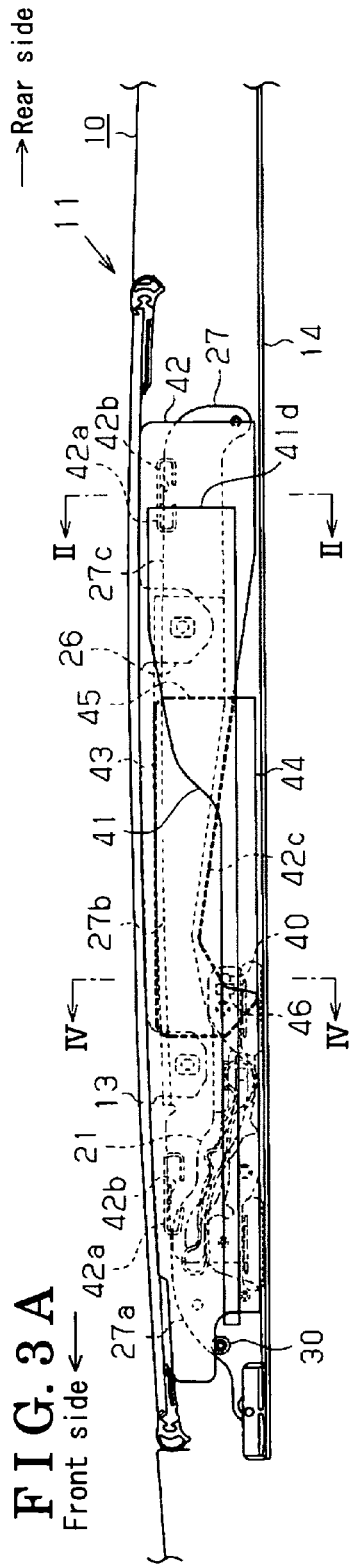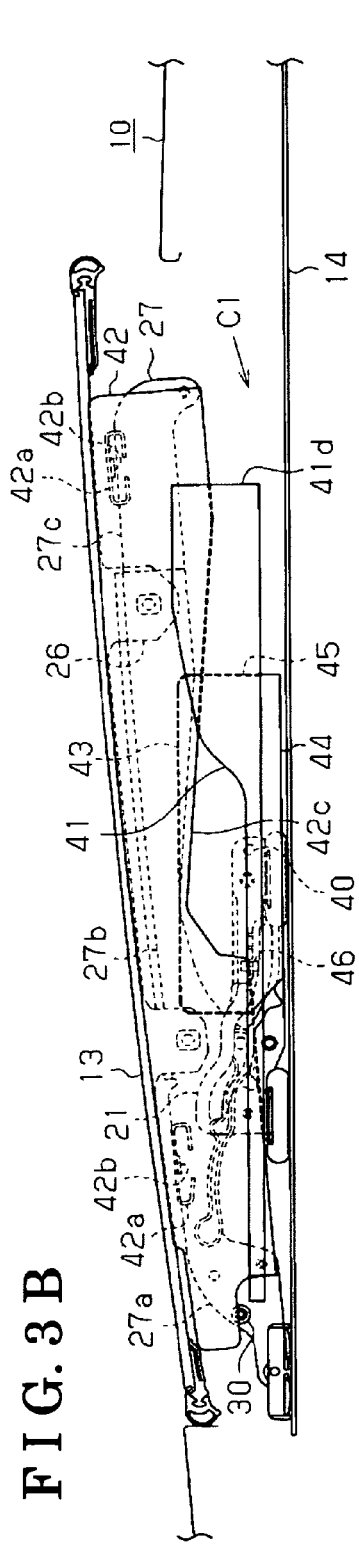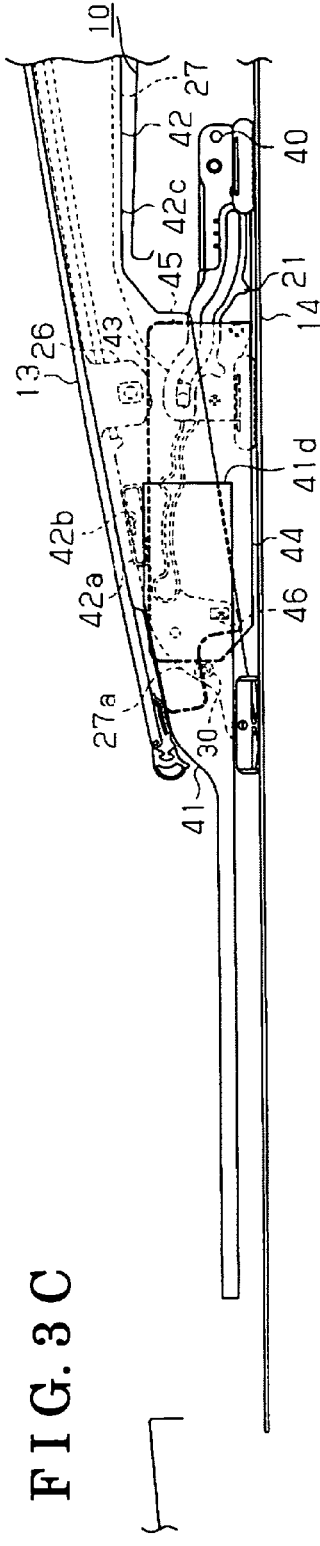

ROOF APPARATUS FOR VEHICLE

CROSS REFERENCE TO RELATED APPLICATIONS

This application is based on and claims priority under 35 U.S.C. §119 to Japanese Patent Application 2010-064334, filed on Mar. 19, 2010, and Japanese Patent Application 2010-209785, filed on Sep. 17, 2010, the entire contents of which are incorporated herein by reference.

TECHNICAL FIELD

This disclosure relates to a roof apparatus for a vehicle.

BACKGROUND DISCUSSION

A known roof apparatus for a vehicle, disclosed in JP1980-087621A, JP2002-274182A, and JP2000-190735A (that will be referred to as References 1, 2, and 3) opens and closes an opening portion formed in a roof portion of the vehicle by moving a movable panel in a longitudinal direction of the vehicle. The roof apparatus is a so-called inner sliding roof apparatus. According to the inner sliding roof apparatus, when being in an opening operation, the movable panel slides and retracts under the roof portion. A garnish (or cover) covering functional components for opening and closing operations of the movable panel is provided at the inner sliding roof apparatus described in References 1, 2, and 3.

Meanwhile, a so-called outer sliding roof apparatus is also known as a roof apparatus for a vehicle. In the outer sliding roof apparatus, a movable panel is in an opening operation while remaining in a tilted-up state (a state where the movable panel rotates around a front end portion so as to move a rear end portion upward). In the case of the opening movement of the movable panel, a clearance is generated between the rear end portion of the movable panel and a roof portion at sides of an opening portion in a width direction of the vehicle. In addition, functional components for opening and closing operations of the movable panel may be exposed at an interior space of the vehicle, therefore deteriorating an appearance of the roof apparatus, which is seen from the interior space of the vehicle. For example, in a case where the roof apparatus according to References 1, 2, and 3 is applied to the outer sliding roof apparatus, the outer sliding roof apparatus is configured to move in the opening direction in a manner to be in the tilted-up state; therefore, the functional components may be seen or not be covered from the interior space of the vehicle when the movable panel is in fully closed and opened states, a tilt-up operation, and the opening operation. That is, any means to eliminate the specific drawback of the outer sliding roof apparatus is not disclosed in the roof apparatus according to References 1 to 3.

A need thus exists for an outer sliding roof apparatus for a vehicle, which is not susceptible to the drawback mentioned above.

SUMMARY

According to an aspect of this disclosure, a roof apparatus for a vehicle includes a guide member arranged on a guide rail and sliding therealong in a longitudinal direction of the vehicle, the guide rail adapted to be mounted at a side edge of an opening portion formed in a roof portion of the vehicle, a support member engaged with the guide member and supporting a movable panel opening and closing the opening portion, a drive member driving the movable panel supported by the support member, the drive member moving the guide member rearward in the longitudinal direction so that the movable panel tilts up and opens remaining in a tilted-up state, a first garnish supported by the guide rail and covering a clearance between the support member and the guide rail from an interior space of the vehicle when the movable panel is in the tilt-up operation and in the opening operation, a second garnish supported by the movable panel and covering the support member from the interior space of the vehicle, the second garnish covering the guide member when the movable panel is in a fully closed state and in the tilt-up operation, and a third garnish connected to the guide member or the support member and slidably supported thereby along the guide rail in the longitudinal direction, the third garnish covering an opening portion defined between the first garnish and the second garnish, from the interior space of the vehicle when the movable panel is in the tilt-up operation, in the fully closed state, and in the opening operation.

BRIEF DESCRIPTION OF THE DRAWINGS

The foregoing and additional features and characteristics of this disclosure will become more apparent from the following detailed description considered with the reference to the accompanying drawings, wherein:

FIG. 1A is a lateral view of a fully closed state of a roof apparatus for a vehicle, according to a first embodiment disclosed here;

FIG. 1B is a lateral view of a tilt-up operation of the roof apparatus according to the first embodiment disclosed here;

FIG. 1C is a lateral view of a fully opened state of the roof apparatus according to the first embodiment disclosed here;

FIG. 2 is a cross sectional view taken along the line II-II of FIG. 3A;

FIG. 3A is a lateral view of the fully closed state of the roof apparatus according to the first embodiment disclosed here;

FIG. 3B is a lateral view of the tilted-up operation of the roof apparatus according to the first embodiment disclosed here;

FIG. 3C is a lateral view of the fully opened state of the roof apparatus according to the first embodiment disclosed here;

DETAILED DESCRIPTION

Figure 6:
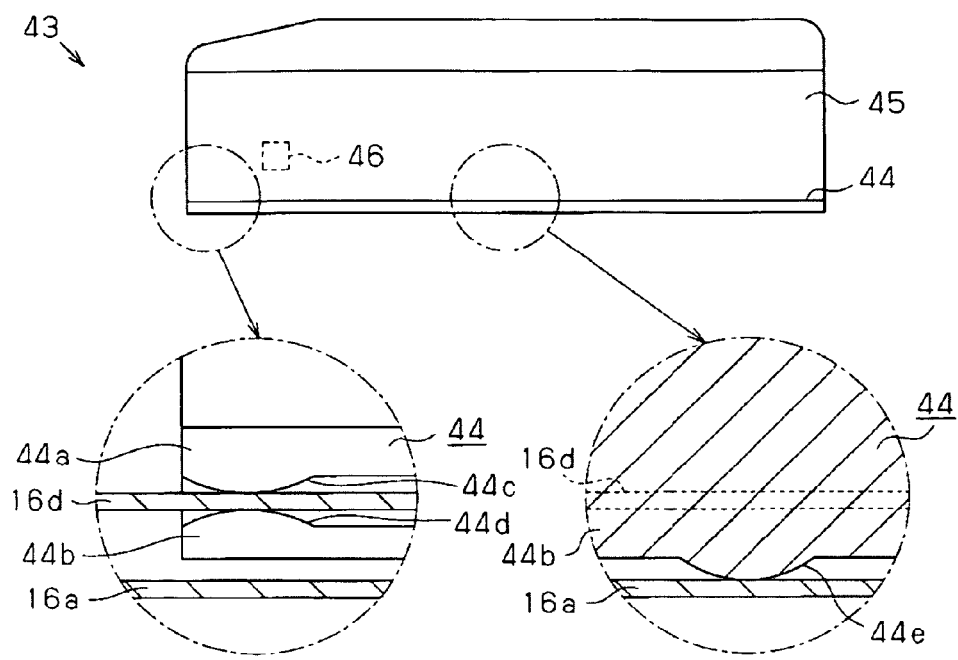
FIG. 6 is a lateral view of a supporting structure of a third garnish relative to a guide rail.
Figure 7:
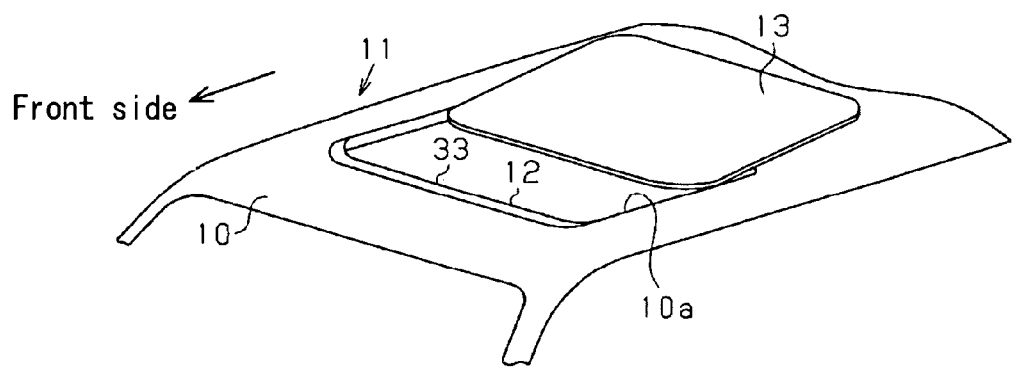
FIG. 7 is a schematic view of a roof of the vehicle.

A roof apparatus 11 for a vehicle such as an automobile, according to a first embodiment of this disclosure will be explained as follows with reference to FIGS. 1 to 7. Directions such as vertical, longitudinal, and width directions will be hereinafter referred to as vertical, longitudinal, and width directions of the vehicle unless otherwise specified. FIG. 7 is a schematic view of the roof apparatus 11 mounted on a roof 10 (roof portion) of the vehicle when seen from an obliquely upward direction of the vehicle. As shown in FIG. 7, the roof 10 includes a roof opening portion 10a (opening portion) having an approximately rectangular shape. The roof apparatus 11 includes a deflector 12 arranged and supported at a front edge of the roof opening portion 10a in the longitudinal direction and a movable panel 13 moving in the longitudinal direction to open and close the roof opening portion 10a. The movable panel 13 having an approximate rectangular shape is formed, for example, by a glass panel.

The deflector 12 rotates around a rear portion to thereby move a front portion upward. In particular, the deflector 12 is tiltably attached to the front edge of the roof opening portion 10a. The deflector 12 is released from a lower side of the movable panel 13 in accordance with an opening operation of the movable panel 13 and thereby tilts up to be positioned above an upper surface of the roof 10 (the deflector 12 is brought into a deployed state). Meanwhile, the deflector 13 is pressed below the upper surface of the roof 10 in accordance with a closing operation of the movable panel 13 and thereby is retracted below the upper surface of the roof 10 (the deflector 12 is brought into a retracted state). The deflector 12 is brought into the deployed state when the roof opening portion 10a is opened, thereby preventing aerial vibrations caused by wind flowing into an interior space of the vehicle.

The movable panel 13 rotates around a front portion; thereby, a rear portion of the movable panel 13 moves upward. That is, the movable panel 13 is arranged on the roof 10 so as to tilt up and slide in the longitudinal direction. In the opening and closing operations, the movable panel 13 slides while remaining in a tilted-up state. That is, the movable panel 13 serves as an outer sliding roof apparatus.

A configuration associated with the opening and closing operations and the like of the movable panel 13 will be explained below. In addition, the roof apparatus 11 includes the aforementioned configurations provided at both sides of the roof opening portion 10a in the width direction of the vehicle. Only one of the sides of the roof opening portion 10a in the width direction will be basically described as follows.

Each of FIGS. 1A to 1C is a lateral view of the roof apparatus 11 while illustrating a portion of the roof apparatus 11. FIG. 1A shows a fully closed state of the movable panel 13. FIG. 1B shows the tilted-up state of the movable panel 13. FIG. 1C shows a fully opened state of the movable panel 13. As illustrated in FIGS. 1A to 1C, the roof apparatus 11 is arranged at the sides of the roof opening portion 10a in the width direction while including guide rails 14 extending in the longitudinal direction. Each of the guide rails 14 is formed, for example, by an extruded member of aluminum. As shown in FIG. 2, the guide rail 14 includes a first rail portion 15 having an opening facing an upper side of the vehicle in the width direction and formed in an approximate C-shape in cross section.

The guide rail 14 further includes a second rail portion 16 (rail portion) arranged adjacent to the first rail portion 15 and further inside than the first rail portion 15 in the width direction. The second rail portion 16 serving as the rail portion has an opening formed in an approximate C-shape in cross section. The approximate C-shape of the opening of the second rail portion 16 faces the upper side of the vehicle. In particular, the second rail portion 16 includes a bottom wall 16a forming a portion of a bottom wall of the guide rail 14, and side walls 16b and 16c vertically formed from the bottom wall 16a toward the upper side of the vehicle and positioned in parallel to each other in the vertical direction. Furthermore, the guide rail 14 includes a pair of guide pieces 16d projecting from the side walls 16b and 16c and facing toward the interior and exterior sides, respectively, in the width direction. In addition, the side wall 16b forms a portion of the first rail portion 15.

Moreover, the guide rail 14 includes a third rail portion 17 arranged adjacent to the second rail portion 16 and further inside than the second rail portion 16 in the width direction. The third rail portion 17 includes an inner-ceiling-lining retaining portion 17a, a guide portion 17b, and a garnish retaining portion 17c. The inner-ceiling-lining retaining portion 17a has an opening formed in an approximate U-shape. The approximate U-shape of the opening of the inner-ceiling-lining retaining portion 17a faces the interior side in the width direction. The guide portion 17b having an opening facing the interior side in the width direction is arranged at an upper side of the inner-ceiling-lining retaining portion 17a so as to be overlapped therewith in the vertical direction. The garnish retaining portion 17c having an opening facing the interior side in the width direction is arranged at an upper side of the guide portion 17b so as to be overlapped therewith in the vertical direction. The inner-ceiling-lining retaining portion 17a, the guide portion 17b, and the garnish retaining portion 17c are arranged adjacent to one another in the vertical direction in such a way that a portion of each of the inner-ceiling-lining retaining portion 17a, the guide portion 17b, and the garnish retaining portion 17c is shared by the others.

As illustrated in FIGS. 1A to 1C and 2, a guide member 21 is attached to the first rail portion 15 of the guide rail 14 so as to move in the longitudinal direction. In particular, the guide member 21 includes a pair of guide shoes 22 in the longitudinal direction and a main body portion 23 formed in a plate and arranged at an upper side of the guide shoes 22 so as to stand vertically therefrom. The pair of guide shoes 22 slides on the first guide rail 15. A guide grove 24 extending in the longitudinal direction is formed in the main body 23. The guide groove 24 has an opening facing the width direction. The guide groove 24 includes a first inclined portion 24a, a linear portion 24b, and a second inclined portion 24c. The first inclined portion 24a slants upward toward a front side of the vehicle. The linear portion 24b is formed continuously from a front end of the first inclined portion 24a toward the front side of the vehicle while extending approximately in parallel with the guide rail 14 in the longitudinal direction. The second inclined portion 24c is formed continuously from a front end of the linear portion 24b while slanting upward toward the front side of the vehicle. In addition, an engagement pin 40 serving as a second engagement portion is fixed to a rear end of the main body portion 23. The engagement pin 40 projects toward the interior side in the width direction so as to extend close to the second rail portion 16 (see FIG. 4). The guide member 21 is connected, for example, to an electric motor 100 (drive member) so as to be driven thereby and to move along the guide rail 14 (first rail portion 15) in the longitudinal direction.

As illustrated in FIG. 2, a support panel 26 formed, for example, by a metallic plate is fixed to a lower surface of the movable panel 13 so as to be positioned at each side edge of the movable panel 13. The side edge of the movable panel 13 is located at an upper side of the guide rail 14. As shown in FIGS. 1A to 1C, a support bracket 27 serving as a support member formed by a metallic plate and extending in the longitudinal direction is fixed to the support panel 26. The support bracket 27 extending in an approximately entire length of the movable panel 13 includes a front end portion 27a, an intermediate portion 27b, and a rear end portion 27c. The intermediate portion 27b and the rear end portion 27c are positioned further rearward than the front end portion 27a. A notch 27d is formed at a lower side of the front end portion 27a. A notch 27e is formed at a lower side of the intermediate portion 27b and the rear end portion 27c so as to extend therealong. A front end (the front end portion 27a) of the support bracket 27, which is positioned at a lower side of a front edge of the movable panel 13 is rotatably connected to a front guide shoe 28 sliding on the first rail portion 15. That is, the movable panel 13 supported by the support bracket 27 and the like rotates around the front end of the support bracket 27 to thereby tilt up and down the rear portion of the movable panel 13.

In addition, a guide pin 29 is fixed to the support bracket 27 so as to be positioned at a rear end of the front end portion 27a, which is adjacent to the notch 27e. The guide pin 29 extending in the width direction is slidably inserted in the guide groove 24. As illustrated in FIG. 1A, when the movable panel 13 is in the fully closed state, the guide pin 29 is set to be positioned at a lower end of the guide groove 24 (first inclined portion 24a). Accordingly, the guide member 21 moves toward a rear side of the vehicle along the guide rail 14 (first rail portion 15) from the aforementioned condition where the guide pin 29 is positioned at the lower end of the guide groove 24; thereafter, the guide pin 29 guided by the guide groove 24 slides up along the first slanted portion 24a and reaches the linear portion 24b. At this time, the movable panel 13 rotates around the front end of the support bracket 27 to thereby tilt up the rear portion of the movable panel 13 as illustrated in FIG. 1B. In addition, when the movable panel 13 is in a tilt-up operation, the support bracket 27 (movable panel 13) moves rearward while the guide pin 29 inserted in the guide groove 24 is pressed thereby. The rearward movement of the support bracket 27 is appropriately controlled by a check mechanism.

Then, the guide member 21 moves further rearward along the guide rail 14 (first rail portion 15); thereafter, the guide pin 29 guided by the guide groove 24 slides up along the second slanted portion 24c and reaches a front end of the second slanted portion 24c. At this time, the movable panel 13 further rotates around the front end of the support bracket 27 to thereby tilt up the rear portion of the movable panel 13. In addition, the movable panel 13 moves in an opening direction along with the guide member 21. As shown in FIG. 1C, when the movable panel 13 is in the fully opened state, the notch 27e of the support bracket 27 is lifted above a rear edge of the roof opening portion 10a to thereby prevent the movable panel 13 from interfering with the roof opening portion 10a.

Meanwhile, when the guide member 21 moves forward from a condition where the movable panel 13 is in the fully opened state, the movable panel 13 operates basically in reverse order from the aforementioned rearward movement of the guide member 21. The rotation of the movable panel 13 around the front end of the support bracket 27 is appropriately controlled by the check mechanism until the movable panel 13 returns to a condition where the movable panel 13 starts tilting up (the condition of the movable panel 13 will be referred to as a tilt-up starting state). Accordingly, the rear portion of the movable panel 13 is prevented from suddenly moving down and interfering with the roof 10 when the movable panel 13 moves from the fully opened state to the fully closed state.

An engagement pin 30 serving as a first engagement portion extends toward the interior side in the width direction. The engagement pin 30 is fixed to a front side of the notch 27d of the support bracket 27 so as to extend above the second rail portion 16 toward the interior side in the width direction.

Figure 5:
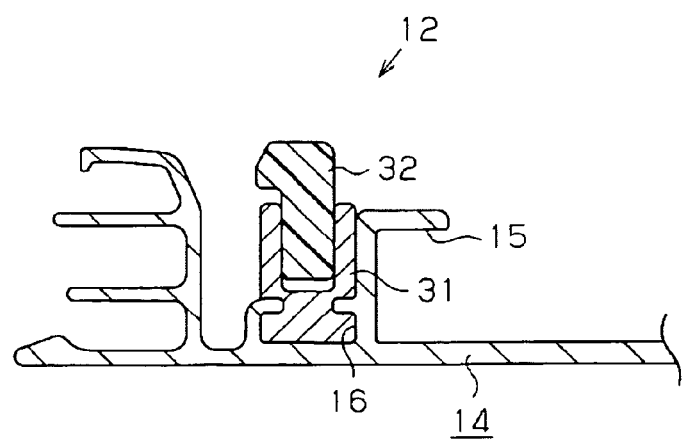
FIG. 5 is a cross sectional view taken along the line V-V of FIG. 1C.

As illustrated in a cross sectional view of FIG. 5 seen in the width direction, resin base members 31 each configuring a hinge portion of the deflector 12 are attached and fixed to the second rail portion 16 of the guide rail 14. The deflector 12 includes a pair of arm portions 32 and a main body 33. The arm portions 32 extend toward the front side of the vehicle from the respective base members 31 arranged at the sides of the roof opening portion 10a in the width direction. The main body 33 extends in the width direction and connects the arm portions 32 to each other. Accordingly, the deflector 12 is formed in an approximate U-shape (see FIG. 7). The deflector 12 is appropriately biased by a biasing member so as to protrude above the upper surface of the roof 10. When the movable panel 13 is in the fully closed state or in the tilt-up starting state (see FIGS. 1A and 1B), an upper surface of each of the arm portions 32 is pressed by the engagement pin 30 so that the deflector 12 is retracted below the upper surface of the roof 10. After the movable panel 13 starts moving in the opening direction while remaining in the tilted-up state, the deflector 12 pressed by the engagement pin 30 is released therefrom and thereafter protrudes above the upper surface of the roof 10 by means of a biasing force of the biasing member (see FIG. 1C).

As shown in FIG. 2, a support member 37 formed in an approximate U-shape in cross-section is fitted to the inner-ceiling-lining retaining portion 17a of the third rail portion 17. The support member 37 supports a peripheral portion of an inner ceiling lining 36 having an opening facing the roof opening portion 10a in the vertical direction. A sun shade 38 formed in an approximate square and connected to the movable panel 13 by means of an appropriate connecting member is attached to the guide portion 17b so as to move in the longitudinal direction. The sun shade 38 moves in opening and closing directions in conjunction with the opening and closing operations of the movable panel 13.

A first garnish 41 formed by a resin material or a two-colored forming material of a resin and a rubber is supported by the garnish retaining portion 17c. In particular, the first garnish 41 includes a holder portion 41a and a pair of pressure contact portions 41b and 41c. The holder portion 41a is formed in an approximate U-shape in cross section. The approximate U-shape of the holder portion 41a has an opening facing the exterior side in the width direction and extending over an entire length of the first garnish 41. A lower edge of the opening of the holder portion 41a is diverged into the pressure contact portions 41b and 41c so as to be formed in an approximate V-shape extending toward the upper side of the vehicle. When a lower portion of the holder portion 41a of the first garnish 41 is inserted in the garnish retaining portion 17c, the pressure contact portions 41b and 41c are pressed in contact with a facing surface of the garnish retaining portion 17c, which faces the pressure contact portions 41b and 41c; thereby, the first garnish 41 is supported by the garnish retaining portion 17c. In particular, the pressure contact portions 41b and 41c are pressed in contact with two different portions on the facing surface of the garnish retaining portion 17c, thereby preventing the first garnish 41 from being dislocated because of vibrations occurring mainly at the garnish retaining portion 17c extending in the longitudinal direction.

Here, as shown in FIGS. 3A to 3C, the first garnish 41 further includes a covering portion 41d vertically formed from a rear end of the holder portion 41a toward the upper side of the vehicle and having a fin shape. As illustrated in FIG. 3B, when the movable panel 13 is in the tilt-up operation, the covering portion 41d covers a clearance C1 between the support bracket 27 (rear end portion 27c) and the guide rail 14 from the interior space of the vehicle in an overlapping manner from the interior side in the width direction. In addition, when the movable panel 13 moves in the opening direction, the covering portion 41d covers the clearance C1 between the support bracket 27 and the guide rail 14 from the interior space of the vehicle in the same way as in the tilt-up operation of the movable panel 13.

As illustrated in FIGS. 3A to 3C, a second garnish 42 formed in a long plate extending over an approximately entire length of the support panel 26 is supported by the support panel 26 (movable panel 13). The second garnish 42 is formed by a resin material or a two-colored forming material of a resin and a rubber. In particular, as shown in FIG. 2, the support panel 26 includes a pair of support portions 26a in the longitudinal direction and locking holes 26b formed vertically in the support portions 26a, respectively. The support portions 26a extend toward the interior side in the width direction so as to overlap the upper side of the second rail portion 16. Meanwhile, holder portions 42a and locking pawls 42b are formed at the second garnish 42. The holder portions 42a extend toward the exterior side in the width direction while facing the support portions 26a, respectively, in the vertical direction. Each of the holder portions 42a is formed in an approximate C-shape in cross section when seen from a protruding direction of the holder portion 42a. The locking pawls 42b are inserted in the locking holes 26b of the support portions 26a, respectively. The second garnish 42 is arranged between the second rail portion 16 and the third rail portion 17 that are adjacent to the first garnish 41 and further outside than the first garnish 41 in the width direction. The support portions 26a are inserted into the holder portions 42a, respectively and the locking pawls 42b are inserted in the locking holes 26b, respectively; thereby, the second garnish 42 is supported by the support panel 26.

Here, as shown in FIGS. 3A to 3C, the second garnish 42 includes a notch 42c having a shape conforming to a shape of the intermediate portion 27b of the support bracket 27. Accordingly, the second garnish 42 covers the support bracket 27 approximately over the entire length of the support bracket 27 from the interior space of the vehicle in an overlapping manner from the interior side in the width direction. As illustrated in FIG. 3C, when the movable panel 13 is in the fully opened state, the notch 42 of the second garnish 42 is lifted up above the rear edge of the roof opening portion 10a, thereby preventing the second garnish 42 from interfering with the roof 10.

Moreover, as illustrated in FIGS. 3A and 3B, when the movable panel 13 is in the fully closed state and in the tilt-up operation, a front end portion of the second garnish 42 covers the guide member 21 from the interior space of the vehicle in an overlapping manner from the interior side in the width direction.

As shown in FIG. 2, a third garnish 43 formed by a resin material or a two-colored forming material of a resin and a rubber is supported by the second rail portion 16 of the guide rail 14 so as to be movable in the longitudinal direction. In particular, a guide shoe 44 is formed at the third garnish 43 approximately over the entire length of the third garnish 43. The guide shoe 44 includes an upper guide portion 44a and a lower guide portion 44b. The upper guide portion 44a extends in the width direction at an upper side of the guide pieces 16d while the lower guide portion 44b extends in the width direction at a lower side of the guide pieces 16d. Thus, the guide shoe 44 is formed in an approximate H shape in cross section. Each of the guide pieces 16d is sandwiched between the upper guide portion 44a and the lower guide portion 44b in the vertical direction. As illustrated in FIG. 6, the guide shoe 44 further includes approximate arch-shaped first pressure contact portions 44c formed at front and rear ends, respectively, of the upper guide portion 44a, and approximate arch-shaped first pressure contact portions 44d formed at front and rear ends, respectively, of the lower guide portion 44b. The first pressure contact portions 44c and 44d face each other in the vertical direction. The vertically facing first pressure contact portions 44c and 44d of the upper and lower guide portions 44a and 44b are provided in first and second separated portions of the guide piece 16d in the longitudinal direction while being pressed in contact with the guide piece 16d sandwiched between the upper guide portion 44a and the lower guide portion 44b in the vertical direction. The first and second separated portions of the guide piece 16d approximately correspond to the front and rear ends of each of the upper and lower guide portions 44a and 44b. Furthermore, the guide shoe 44 includes an approximate arch-shaped second pressure contact portion 44e at a substantially intermediate portion of the lower guide portion 44b in the longitudinal direction (at a substantially intermediate portion between the first and second separated portions of the guide piece 16d) while being pressed in contact with the bottom wall 16a of the second rail portion 16. Thus, the third garnish 43 is supported by the guide piece 16d by use of three portions that are the first and second separated portions of the guide piece 16d and the intermediate portion between the first and second separated portions of the guide piece 16d. Such supporting configuration of the third garnish 43 relative to the second rail portion 16 may prevent vibrations of the third garnish 43 by minimizing a sliding resistance between the third garnish 43 and the second rail portion 16.

In addition, the third garnish 43 includes a covering portion 45 formed in a flat plate and vertically arranged at an upper side of the guide shoe 44. The covering portion 45 is positioned further rearward in the longitudinal direction than the engagement pin 30 provided at the support bracket 27. Accordingly, the engagement pin 30 engages with the covering portion 45 in accordance with the rearward movement of the support bracket 27 (movable bracket 13). As a result, the third garnish 43 is pressed by the engagement pin 30 to move rearward along with the support bracket 27 (movable bracket 13) accordingly.

Figure 4:
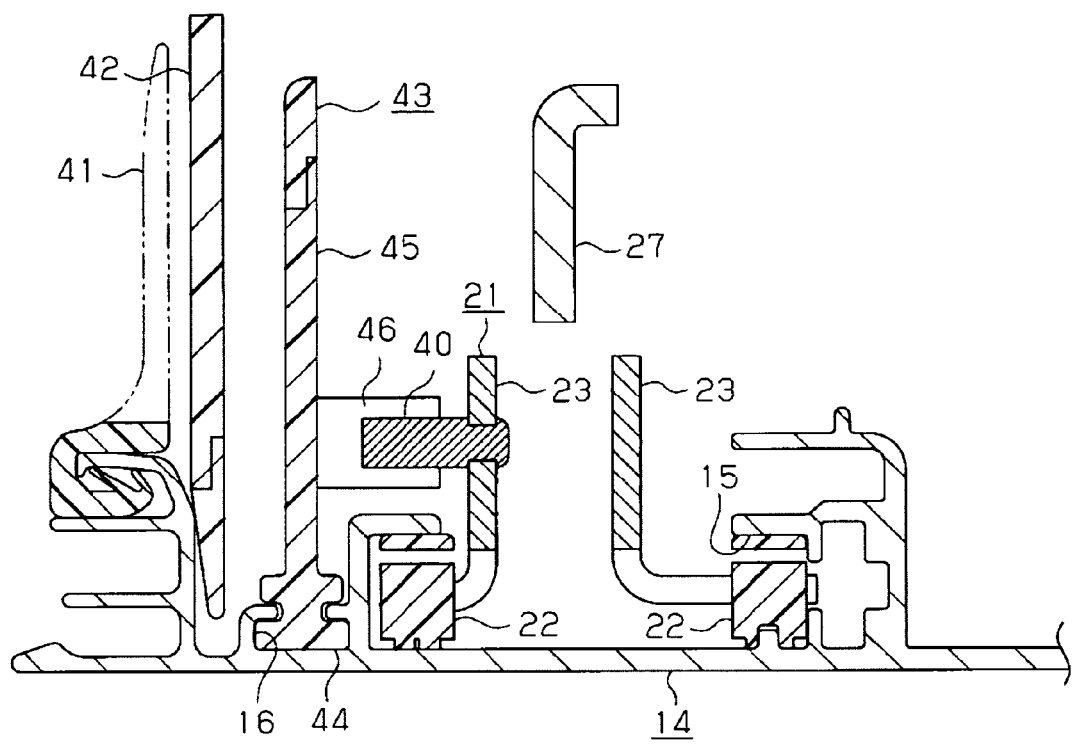
FIG. 4 is a cross sectional view taken along the line IV-IV of FIG. 3A.

Moreover, as shown in a cross sectional view of FIG. 4 in the width direction, the third garnish 43 includes a protruding portion 46 (protruding engagement portion) protruding toward the exterior side in the width direction and formed in a block. The protruding portion 46 is positioned further forward in the longitudinal direction than the engagement pin 40 provided at the guide member 21, in such a way that the engagement pin 40 is restricted from moving further forward than the protruding portion 46. Accordingly, the engagement pin 40 engages with the protruding portion 46 in accordance with the forward movement of the guide member 21 (movable panel 13). As a result, the third garnish 43 is pressed by the engagement pin 40 to move forward along with the guide member 21 (movable panel 13) accordingly.

When the movable panel 13 is brought into the fully closed state in accordance with the forward movement of the guide member 21, the covering portion 45 (third garnish 43) pressed by the engagement pin 40 is arranged away from the engagement pin 30 by a predetermined distance in the longitudinal direction. Such arrangement of the covering portion 45 may prevent the third garnish 43 from starting moving at least before the completion of the tilt-up operation of the movable panel 13. That is, the movable panel 13 moves in the opening direction by the predetermined distance while sliding; therefore, the third garnish 43 starts moving rearward.

Further, as shown in FIG. 3A, when the movable panel 13 is in the fully closed state, the covering portion 45 covers at least the intermediate portion 27b of the support bracket 27 from the interior space of the vehicle in an overlapping manner from the interior side in the width direction. At this time, the covering portion 45 covers the notch 42c while being positioned further outside in the width direction than the second garnish 42. Furthermore, as shown in FIG. 3B, when the movable panel 13 is in the tilt-up operation, the covering portion 45 covers the clearance C1 between the support bracket 27 (intermediate portion 27b) and the guide rail 14 and the guide member 21 from the interior side of the vehicle in an overlapping manner from the interior side in the width direction. In addition, in the same way as in the fully closed state of the movable panel 13, when the movable panel 13 is in the opening operation, the covering portion 45 covers the clearance C1 and the guide member 21 from the interior space of the vehicle. Moreover, as shown in FIG. 3C, when the movable panel 13 is in the fully opened state, the covering portion 45 covers a clearance defined between the front end portion 27a of the support bracket 27 and the guide rail 14 and the guide member 21, from the interior space of the vehicle in an overlapping manner from the interior side in the width direction. In addition, as illustrated in FIGS. 3A and 3B, when the movable panel 13 is in the fully closed state and in the tilt-up operation, the covering portion 45 covers a clearance (opening portion), which is formed by the first garnish 41 and the second garnish 42, from the interior space of the vehicle in an overlapping manner from the exterior side in the width direction. The clearance (opening portion) is defined by the notch 42 that is formed mainly in order to prevent the second garnish 42 from interfering with the roof 10. Additionally, when the movable panel 13 is in the opening operation, the covering portion 45 covers the clearance formed by the first garnish 41 and the second garnish 42, from the interior side of the vehicle in the same way as when the moveable panel 13 is in the fully closed state and in the tilt-up operation.

According to the first embodiment, the second rail portion 16 (rail portion) of the guide rail 14 supports thereat the third garnish 43. In addition, the guide rail 14 is utilized as an attaching portion for attaching the base member 31 configuring the hinge portion of the deflector 12 to the guide rail 14. According to such configuration of the second rail portion 16, an extra space at the guide rail 14 for arranging thereon an additional attaching portion for attaching the base member 31 to the guide rail 14 and the like may be reduced.

According to the first embodiment, the first, second, and third garnishes 41, 42, and 43 covering the guide member 21, the support bracket 27, and the like are configured by separated members from one another, therefore being separately attached to the guide rail 14 and leading to reduction of man-hours for attaching the first, second, and third garnishes 41, 42, and 43 on the guide rail 14. In addition, the first, second, and third garnishes 41, 42, and 43 are arranged so as not to overlap with one another in the width direction, thereby being prevented from interfering with one another and inhibiting occurrence of abnormal noises due to the interference.

The roof apparatus 11 according to a second embodiment will be explained as follows with reference to FIGS. 8, 9, 10A, 10B, 11A, and 11B. The second embodiment differs from the first embodiment in that a protruding portion 51 (protruding engagement portion) of the third garnish 43 is modified from the protruding portion 46 of the third garnish 43 according to the first embodiment. Accordingly, detailed explanations of similar configurations of the second embodiment to those of the first embodiment will be omitted.

Figure 8:
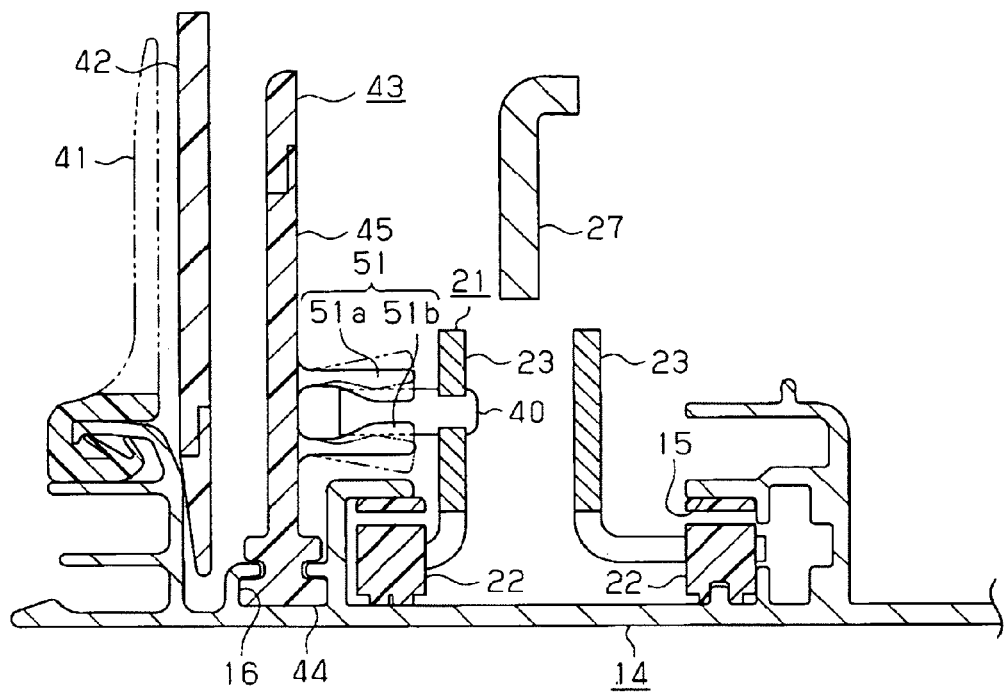
FIG. 8 is a cross sectional view taken along the line VIII-VIII of FIG. 10B illustrating a second embodiment disclosed here.
Figure 9:
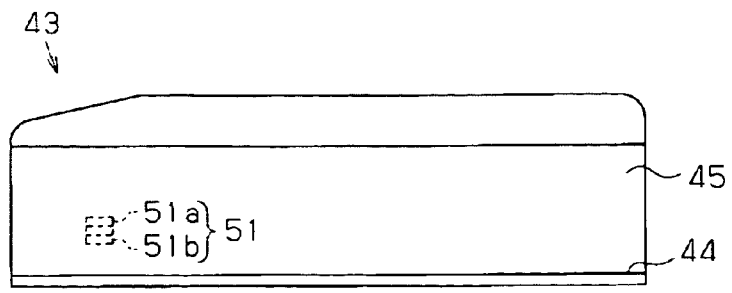
FIG. 9 is a lateral view of the third garnish of the roof apparatus according to the second embodiment disclosed here.

As illustrated in FIGS. 8 and 9, the third garnish 43 according to the second embodiment includes the protruding portion 51 serving as the protruding engagement portion arranged to protrude from the covering portion 45 toward the exterior side in the width direction. The protruding portion 51 is positioned further forward in the longitudinal direction than the engagement pin 40 arranged at the guide member 21, in such a way that the engagement pin 40 may be restricted from moving further forward than the protruding portion 51 (see FIG. 10A). The protruding portion 51 includes a pair of elastic portions 51a and 51b arranged at upper and lower sides, respectively, of the engagement pin 40 (see FIG. 8).

Figure 10A:
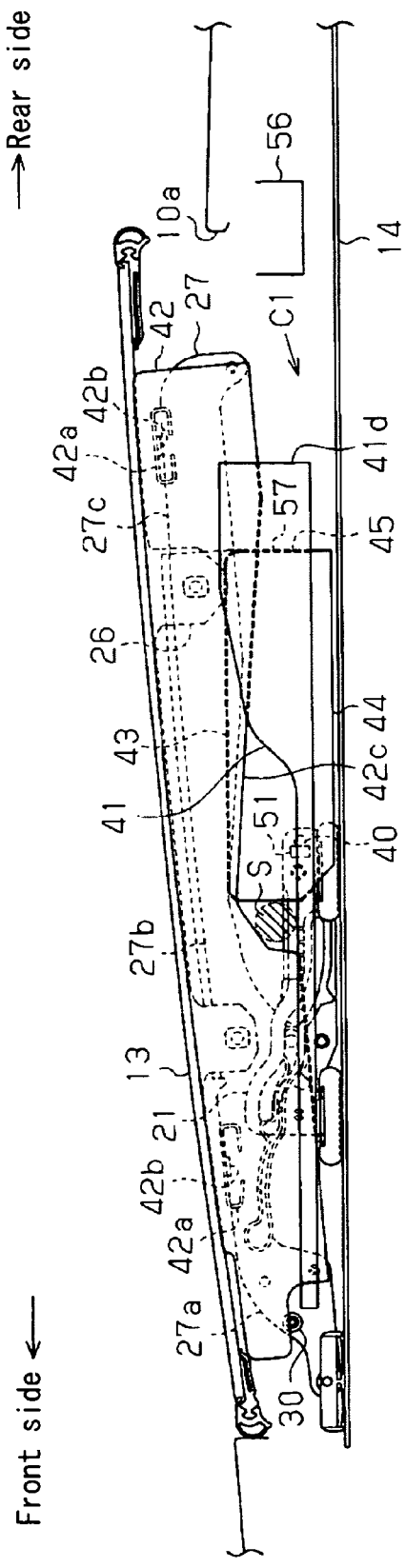
FIG. 10A is a lateral view of the roof apparatus according to the second embodiment disclosed here.
Figure 10B:
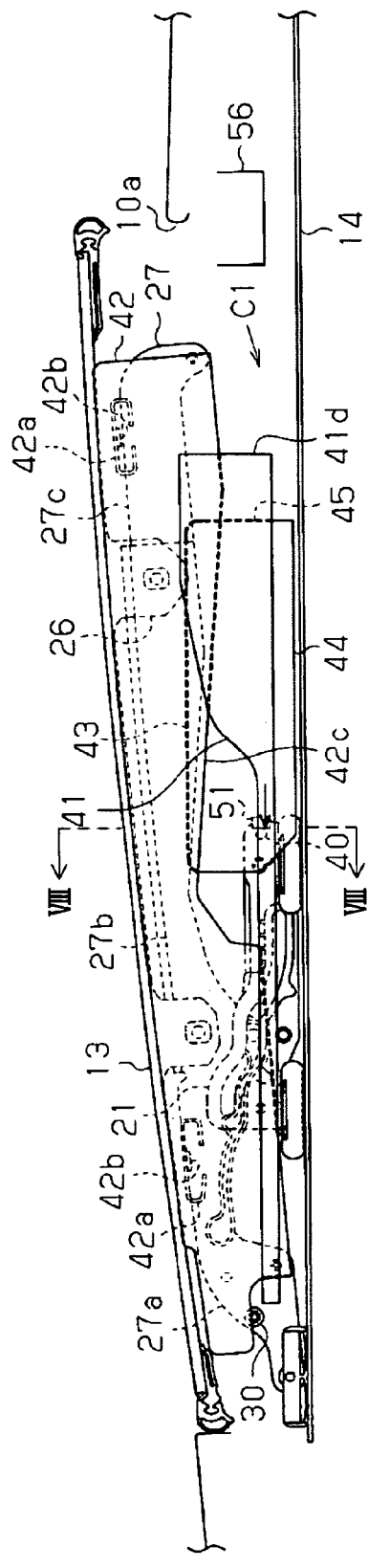
FIG. 10B is a lateral view of the roof apparatus according to the second embodiment disclosed here.

In addition, a drain 56 serving as a stopper member extending in the width direction is provided on the roof 10 along the rear edge of the roof opening portion 10a so as to connect the guide rails 14 to each other in the width direction (see FIGS. 10A and 10B). The drain 56 receives water drops falling down from a rear edge of the movable panel 13 when the movable panel 13 is in the fully closed state or right after the movable panel 13 moves in the opening direction. The drain 56 is arranged on the roof 10 so as not to interfere with the movement of the guide member 21 and so as to restrict a rearward movement of a rear end surface 57 of the third garnish 43 (covering portion 45).

Here, the engagement pin 40 engages with the protruding portion 51 in accordance with the forward movement of the guide member 21 (movable panel 13). Accordingly, the third garnish 43 is basically pressed by the engagement pin 40, thereby moving forward along with the guide member 21 (movable panel 13).

In addition, when a force larger than a predetermined force is applied from the engagement pin 40 to the protruding portion 51, the elastic portions 51a and 51b are moved toward the upper and lower sides, respectively, of the engagement pin 40, therefore allowing the engagement pin 40 to move further forward and rearward than the protruding portion 51. Accordingly, for example, even when an obstacle S is caught in the clearance between the first garnish 41 and the second garnish 42 at the time of the forward movement of the guide member 21 along with the third garnish 43 as illustrated in FIGS. 10A and 10B, that is, when the movable panel 13 moves in the closing direction, the force larger than the predetermined force is applied from the engagement pin 40 to the protruding portion 51. Accordingly, the pair of elastic portions 51a and 51b is moved toward the upper and lower sides, respectively, of the engagement pin 40, thereby moving the engagement pin 40 further forward than the protruding portion 51. As a result, the third garnish 43 is prevented from moving further forward and the obstacle S is prevented from being caught by the third garnish 43 between the aforementioned clearance and the third garnish 43.

Figure 11A:
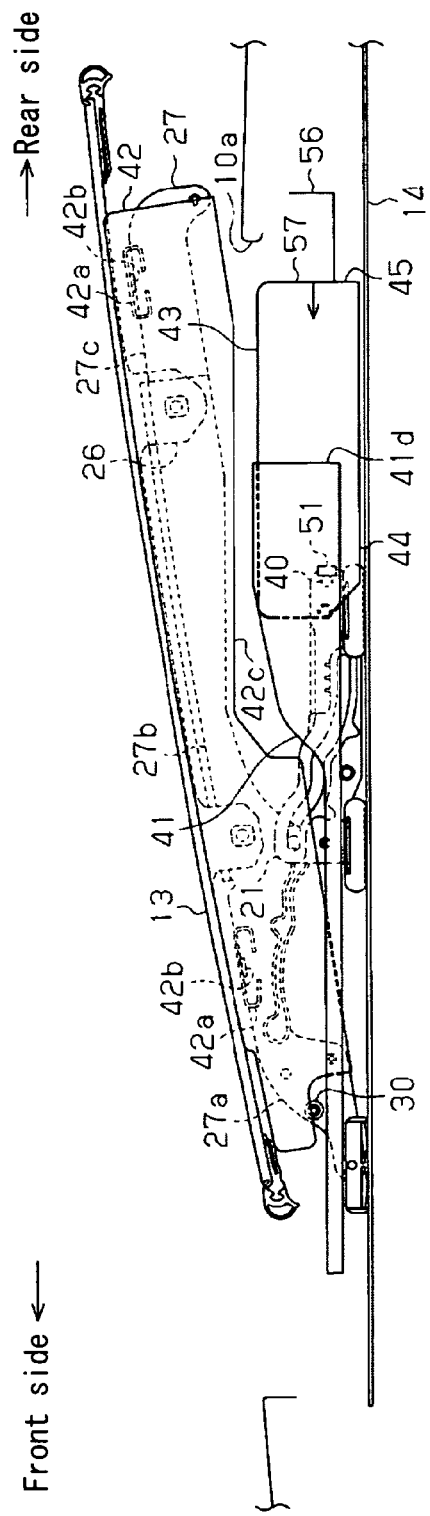
FIG. 11A is a lateral view of the roof apparatus according to the second embodiment disclosed here.
Figure 11B:
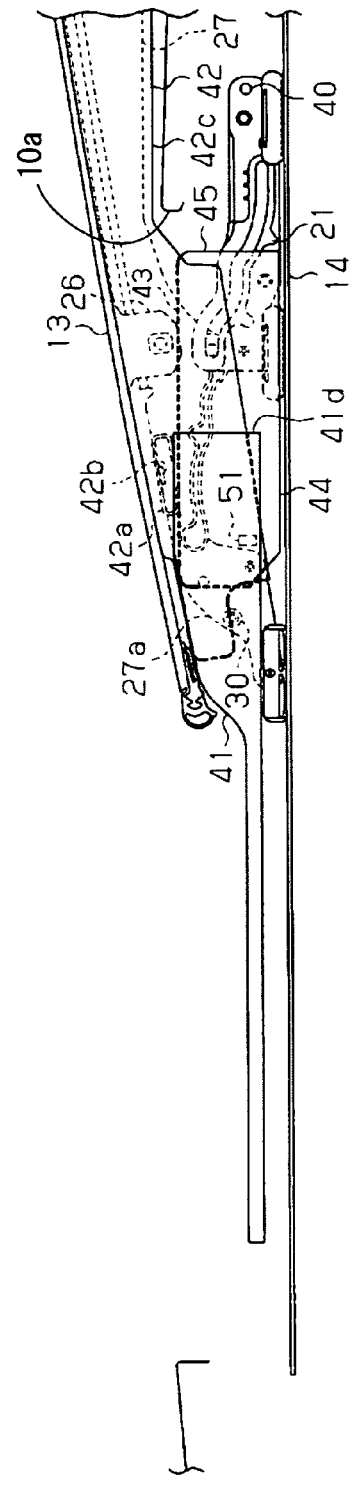
FIG. 11B is a lateral view of the roof apparatus according to the second embodiment disclosed here.

When the guide member 21 moves rearward under a condition where the engagement pin 40 is positioned further forward than the protruding portion 51 as illustrated in FIGS. 11A and 11B, that is, when the movable panel 13 moves in the opening direction, the protruding portion 51 engages with the engagement pin 40 to thereby move the third garnish 43 rearward along with the guide member 21. At this time, the rear end surface 57 makes contact with the drain 56, therefore preventing the third garnish 43 from moving further rearward. Then, the force larger than the predetermined force is applied from the engagement pin 40 to the protruding portion 51; therefore, the pair of elastic members 51*a* and 51*b* is moved toward the upper and lower sides, respectively, of the engagement pin 40. As a result, the engagement pin 40 moves further rearward than the protruding portion 51 and therefore returns to an initial position.

According to the roof apparatus 11 of the second embodiment, the rearward movement of the third garnish 43 is restricted by utilizing the existing drain 56 without an additional stopper member, therefore preventing the number of components from increasing.

A third embodiment of the roof apparatus 11 will be explained as follows with reference to FIGS. 12A and 12B. The third embodiment differs from the second embodiment in that the position of a protruding portion 61 (protruding engagement portion) of the third garnish 43 is modified from the position of the protruding portion 51 of the second embodiment; therefore, detailed explanations of similar configurations of the third embodiment to those of the second embodiment will be omitted.

Figure 12A:
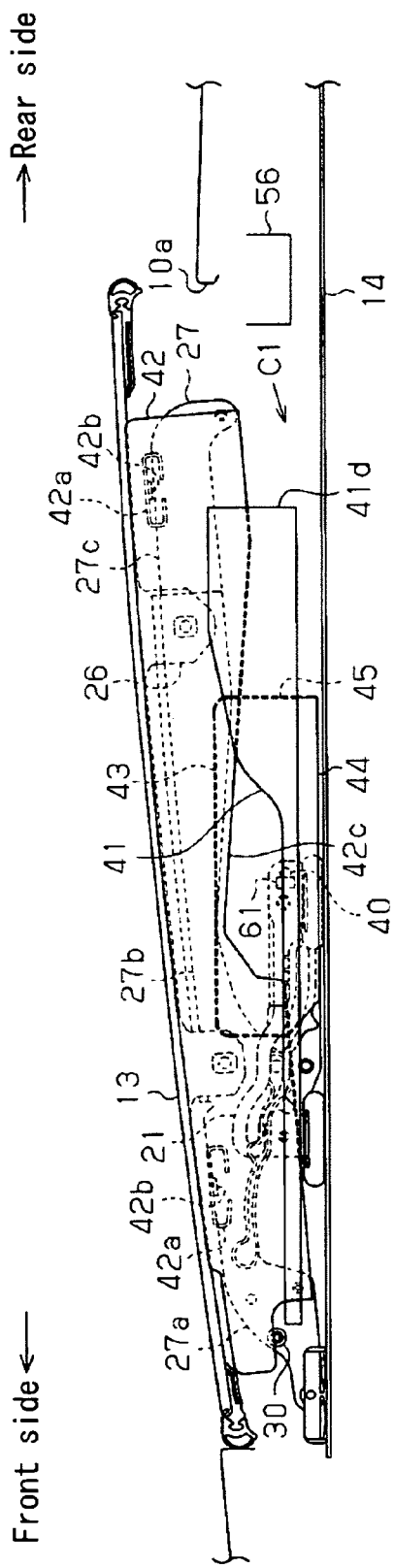
FIG. 12A is a lateral view of the roof apparatus according to a third embodiment disclosed here.
Figure 12B:
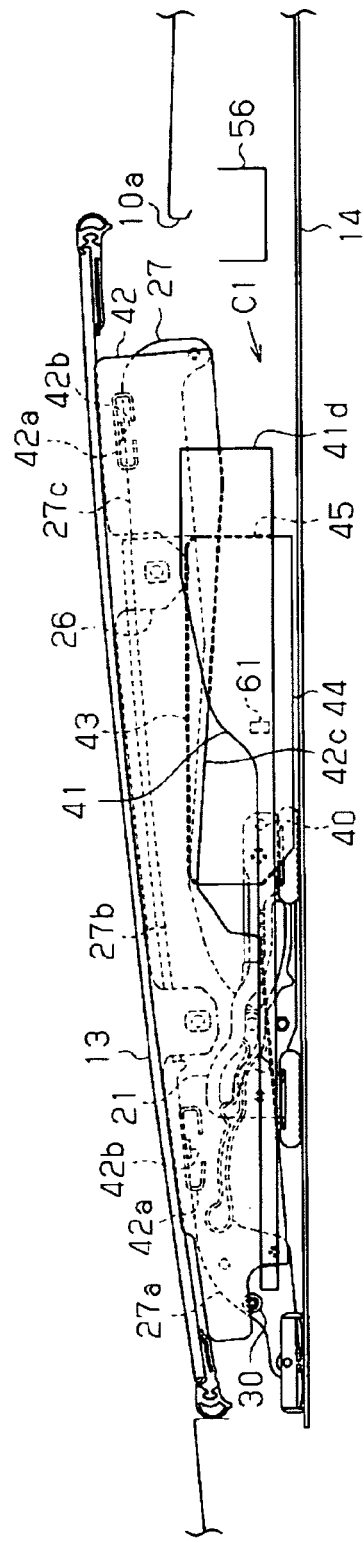
FIG. 12B is a lateral view of the roof apparatus according to the third embodiment disclosed here.

According to the third embodiment, the protruding portion 61 is arranged at an intermediate portion of the covering portion 45 in the longitudinal direction as shown in FIGS. 12A and 12B. The intermediate portion of the covering portion 45 is located further rearward in the longitudinal direction than the position of the protruding portion 51 according to the second embodiment. The protruding portion 61 includes the pair of elastic portion 51*a* and 51*b* in the same way as the protruding portion 51 (see FIGS. 8A and 8B).

As illustrated in FIG. 12A, according to the third embodiment, even when the guide member 21 moves forward along with the third garnish 43, that is, even when the movable panel 13 is in the closing operation, the clearance (opening portion) formed by the first garnish 41 and the second garnish 42 is covered by the third garnish 43 from the interior space of the vehicle.

When the movable panel 13 moves in the closing direction to be in the fully closed state, the third garnish 43 overlaps the support panel 26 fixed to the support bracket 27 in the width direction. The support bracket 27 and the support panel 26 are fastened to each other under a condition where the movable panel 13 is in the fully closed state; thereby, the roof apparatus 11 is mounted on the roof 10. At this time, a space for such fastening operation between the support bracket 27 and the support panel 26 may be limited. Accordingly, prior to the fastening operation, the third garnish 43 is pressed rearward to thereby apply the force larger than the predetermined force from the engagement pin 40 to the protruding portion 61. Consequently, the engagement pin 40 is moved further forward than the protruding portion 61 to thereby move the third garnish 43 further rearward (see FIG. 12B). Thus, under a condition where the movable panel 13 is in the fully closed state, the third garnish 43 is prevented from overlapping the support panel 26 in the width direction and the space for the fastening operation may be surely obtained. As a result, efficiency in the fastening operation may be increased. After fastening the support bracket 27 and the support panel 26 to each other, the third garnish 43 is moved further rearward along with the guide member 21. Then, the further rearward movement of the third garnish 43 is restricted by the drain 56 to therefore return the third garnish 43 to an initial position (see FIG. 12A).

As described above, in addition to effects similar to the effects of the first embodiment and the effects of the second embodiment, following effects may be obtained according to the third embodiment. Even when the movable panel 13 is in the closing operation, the third garnish 43 covers the clearance between the first garnish 41 and the second garnish 42 from the interior space of the vehicle as in the first and second embodiments. In addition, in the case of mounting the roof apparatus 11 on the roof 10, the space for fastening the support bracket 27 and the support panel 26 to each other may be surely obtained at a front side of the third garnish 43, therefore increasing the efficiency in the fastening operation. After fastening the support bracket 27 and the support panel 26 to each other, the third garnish 43 is moved rearward along with the guide member 21. Then, the rearward movement of the third garnish 43 is restricted by the drain 56 to thereby return the engagement pin 40 and the protruding portion 61 to the respective initial positions.

In addition, the roof apparatus 11 according to the first embodiment may be modified as follows. The garnish 43 may be directly connected to the guide member 21 so as to integrally move therewith. Alternatively, the third garnish 43 may be directly connected to the support bracket 27 so as to integrally move therewith as long as the support bracket 27 is allowed to move up and down.

The third garnish 43 according to the second and third embodiments may include the elastic portions 51*a* and 51*b* formed by a different material. For example, a metallic plate spring may be applied instead of the elastic portions 51*a* and 51*b*. In this case, a pair of plate springs serving as the elastic portions 51*a* and 51*b* does not need to be arranged at the upper and lower sides of the engagement pin 40. Alternatively, a single plate spring elastically deformable in the width direction is applicable.

The drain 56 according to the second and third embodiments restricts the rearward movement of the third garnish 43. A different stopper member may be applied instead of the drain 56. In each of the first, second, and third embodiments, the second pressure contact portions 44*e* pressed in contact with the bottom wall 16*a* of the second rail portion 16 may be arranged at two separated portions of the bottom wall 16*a* in the longitudinal direction. In addition, the vertically facing first pressure contact portions 44*c* and 44*d* of the upper and lower guide portions 44*a* and 44*b* are pressed in contact with the guide piece 16*d* and may be provided in an intermediate portion between the second pressure contact portions 44*e* arranged at the two separated portions of the bottom wall 16*a* in the longitudinal direction. In this case, the third garnish 43 is supported by the guide piece 16*d* by use of three portions that are the two separated portions of the bottom wall 16*a* and the intermediate portion between the second pressure contact portions 44*e*. Thus, the same effect as in the first, second, and third embodiment may be obtained.

In the first embodiment, the engagement pin 30 (first engagement portion) engaging with the third garnish 43 (covering portion 45) in accordance with the opening operation of the movable panel 13 may be arranged at the guide member 21. In addition, the engagement pin 40 (second engagement portion) engaging with the third garnish 43 (protruding portion 46) in accordance with the closing operation of the movable panel 13 may be arranged at the support bracket 27.

As described above, according to the first, second, and third embodiments, the first garnish 41 covers the clearance C1 between the rear end portion 27*c* of the support bracket 27 and the guide rail 14 from the interior space of the vehicle when the movable panel 13 is in the tilt-up operation and in the opening operation. The third garnish 43 covers the clearance C1 between the intermediate portion 27*b* of the support bracket 27 and the guide rail 14 and the guide member 21 from the interior space of the vehicle when the movable panel 13 is in the tilt-up operation and in the opening operation. The third garnish 43 covers the clearance defined between the front end portion 27a of the support bracket 27 and the guide rail 14 and the guide member 21 from the interior space of the vehicle when the movable panel 13 is in the fully opened state.

Thus, when the movable panel 13 is in each of the fully closed state, the tilt-up operation, the opening operation, and the fully opened state, the guide member 21, the support bracket 27, and the clearance C1 between the support bracket 27 and the guide rail 14 may be covered from the interior space of the vehicle by the first, second, and third garnishes 41, 42, and 43 in combination with one another, therefore increasing an appearance of the sunroof apparatus 11 seen from the interior space. In addition, the guide member 21 and the support bracket 27 may be inhibited from being touched by an occupant and the occupant may be prevented from accidentally inserting his/her hand and fingers into the clearance C1.

According to the first, second, and third embodiments, the guide member 21 or the support bracket 27 includes either one of the engagement pin 30 and the second engagement pin 40 each engaging with the third garnish 43 when the guide member 21 moves forward and rearward in the longitudinal direction. The engagement pin 30 engages with the third garnish 43 when the guide member 21 moves rearward by the predetermined distance from a position in which the movable panel 13 is in the fully closed state Accordingly, for example, when the movable panel 13 is in the tilt-up starting state, the third garnish 43 covers at least the clearance C1 between the intermediate portion 27b of the support bracket 27 and the guide rail 14 from the interior space of the vehicle while being stopped on the guide rail 14. Consequently, compared to a case where the third garnish 43 covers the clearance C1 from the interior space of the vehicle while moving rearward on the guide rail 14, the third garnish 43 may surely cover the clearance C1 from the interior space of the vehicle.

According to the second embodiment, the roof apparatus 11 further includes the drain 56. The third garnish 43 includes the protruding portion 46, 51 arranged to protrude in a direction to interfere with the movement of the engagement pin 40 and engaging with the engagement pin 40 when the guide member 21 moves forward. The protruding portion 51 is formed by the elastic portions 51a and 51b allowing the engagement pin 40 to move further forward and rearward in the longitudinal direction than the protruding portion 51 when the force larger than the predetermined force is applied from the engagement pin 40 to the protruding portion 51. Further, when the guide member 21 moves rearward, the drain 56 restricts the third garnish 43 from moving further rearward in the longitudinal direction from a condition where the engagement pin 40 positioned further forward than the protruding portion 51 is in engagement with the protruding portion 51.

When the guide member 21 moves forward, the protruding portion 51 engages with the engagement pin 40 to thereby move the third garnish 43 forward. In addition, even when the obstacle S is caught in the clearance between the first garnish 41 and the second garnish 42 at the time of the forward movement of the guide member 21 along with the third garnish 43, that is, when the movable panel 13 moves in the closing direction, the force larger than the predetermined force is applied from the engagement pin 40 to the protruding portion 51. Accordingly, the engagement pin 40 moves further forward than the protruding portion 51. As a result, the third garnish 43 is prevented from moving further forward and the obstacle S is prevented from being caught by the third garnish 43 between the aforementioned clearance and the third garnish 43. Meanwhile, when the guide member 21 moves rearward under a condition where the engagement pin 40 is positioned further forward than the protruding portion 51, the protruding portion 51 engages with the engagement pin 40 to thereby move the third garnish 43 rearward along with the guide member 21. At this time, the rearward movement of the third garnish 43 is prevented by the drain 56. Then, the force larger than the predetermined force is applied from the engagement pin 40 to the protruding portion 51; therefore, the engagement pin 40 moves further rearward than the protruding portion 51 and therefore returns to the initial position.

For example, the third garnish 43 is designed and arranged so as to cover the clearance between the first garnish 41 and the second garnish 42 from the interior space of the vehicle even in a condition where the movable panel 13 is in the closing operation. At this time, a work space for mounting the roof apparatus 11 on the roof 10 may be limited. Prior to the mounting operation, the third garnish 43 is pressed rearward to thereby apply the force larger than the predetermined force from the engagement pin 40 to the protruding portion 51. Accordingly, the engagement pin 40 is moved further forward than the protruding portion 51 to thereby move the third garnish 43 further rearward. As a result, enough space for fastening the support bracket 27 to the movable panel 13 may be obtained and thereby improving efficiency in mounting the roof apparatus 11 on the roof 10. After fastening the support bracket 27 to the movable panel 13, the third garnish 43 is moved rearward along with the guide member 21. Then, the rearward movement of the third garnish 43 is restricted by the drain 56 to return the third garnish 43 to the initial position.

According to the first, second, and third embodiments, the engagement pin 30 engages with the deflector 12 in accordance with the closing operation of the movable panel 13 and serves as an engagement pin allowing the deflector 12 to be retraced below the upper surface of the roof 10.

Accordingly, the second rail portion 16 of the guide rail 14 supports thereat the third garnish 43. In addition, the guide rail 14 is utilized as the attaching portion for attaching the base member 31 configuring the hinge portion of the deflector 12 to the guide rail 14. Consequently, the number of components of the sunroof apparatus 11 may be reduced.

According to the first, second, and third embodiments, the second rail portion 16 of the guide rail 14 supports the third garnish 43 and includes the pair of guide pieces 16d protruding toward the interior and exterior sides, respectively, in the width direction of the vehicle. The third garnish 43 includes the upper and lower guide portions 44a and 44b extending in the width direction and sandwiching therebetween each of the guide pieces 16d in a vertical direction of the vehicle, the first pressure contact portions 44c and 44d formed at the upper and lower guide portions 44a and 44b, respectively, and facing each other via the guide piece 16d in the vertical direction, and the second pressure contact portion 44e formed at the lower guide portion 44b. The vertically facing first pressure contact portions 44c and 44d of the upper and lower guide portions 44a and 44b are provided in the first and second separated portions of the guide piece 16d in the longitudinal direction and pressed in contact with the guide piece 16d. In addition, the second pressure contact portion 44e is in the intermediate portion between the first and second separated portions of the guide piece 16d and pressed in contact with the bottom wall 16a of the second rail portion 16. Alternatively, the second pressure contact portion 44e is provided at each of the first and second separated portions of the bottom wall 16a in the longitudinal direction and pressed in contact with the bottom wall 16a. In addition, the vertically facing first pressure contact portions 44c and 44d of the upper and lower guide portions 44a and 44b are provided in the intermediate portion between the first and second separated portions of the bottom wall 16a and pressed in contact with the guide piece 16d.

Thus, the third garnish 43 is supported by the guide piece 16d by use of the three portions that are the first and second separated portions of the guide piece 16d and the intermediate portion between the first and second separated portions of the guide piece 16d. Such supporting configuration of the third garnish 43 relative to the second rail portion 16 may prevent the vibrations of the third garnish 43 by minimizing the sliding resistance between the third garnish 43 and the second rail portion 16.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus for a vehicle, comprising:
   a guide member arranged on a guide rail and sliding therealong in a longitudinal direction of the vehicle, the guide rail adapted to be mounted at a side edge of an opening portion formed in a roof portion of the vehicle;
   a support member engaged with the guide member and supporting a movable panel opening and closing the opening portion;
   a drive member driving the movable panel supported by the support member, the drive member moving the guide member rearward in the longitudinal direction so that the movable panel tilts up and opens remaining in a tilted-up state;
   a first garnish supported by the guide rail and covering a clearance between the support member and the guide rail from an interior space of the vehicle when the movable panel is in the tilt-up operation and in the opening operation;
   a second garnish supported by the movable panel and covering the support member from the interior space of the vehicle, the second garnish covering the guide member when the movable panel is in a fully closed state and in the tilt-up operation; and
   a third garnish connected to the guide member or the support member and slidably supported thereby along the guide rail in the longitudinal direction, the third garnish covering an opening portion defined between the first garnish and the second garnish, from the interior space of the vehicle when the movable panel is in the tilt-up operation, in the fully closed state, and in the opening operation.

2. The roof apparatus according to claim 1, wherein the first garnish covers the clearance between a rear end portion of the support member and the guide rail from the interior space of the vehicle when the movable panel is in the tilt-up operation and in the opening operation, and the third garnish covers the clearance between an intermediate portion of the support member and the guide rail and the guide member from the interior space of the vehicle when the movable panel is in the tilt-up operation and in the opening operation, the third garnish covering a clearance defined between a front end portion of the support member and the guide rail and the guide member from the interior space of the vehicle when the movable panel is in a fully opened state.

3. The roof apparatus according to claim 1, wherein the guide member or the support member includes either one of a first engagement portion and a second engagement portion each engaging with the third garnish when the guide member moves forward and rearward in the longitudinal direction, and the first engagement portion engages with the third garnish when the guide member moves rearward by a predetermined distance from a position in which the movable panel is in the fully closed state.

4. The roof apparatus according to claim 2, wherein the guide member or the support member includes either one of a first engagement portion and a second engagement portion each engaging with the third garnish when the guide member moves forward and rearward in the longitudinal direction, and the first engagement portion engages with the third garnish when the guide member moves rearward by a predetermined distance from a position in which the movable panel is in the fully closed state.

5. The roof apparatus according to claim 3, further comprising a stopper member, wherein the third garnish includes a protruding engagement portion arranged to protrude in a direction to interfere with a movement of the second engagement portion and engaging with the second engagement portion when the guide member moves forward, the protruding engagement portion being formed by an elastic portion allowing the second engagement portion to move further forward and rearward in the longitudinal direction than the protruding engagement portion when a force larger than a predetermined force is applied from the second engagement portion to the protruding engagement portion, and wherein when the guide member moves rearward, the stopper member restricts the third garnish from moving further rearward in the longitudinal direction from a condition where the second engagement portion positioned further forward than the protruding engagement portion is in engagement with the protruding engagement portion.

6. The roof apparatus according to claim 4, further comprising a stopper member, wherein the third garnish includes a protruding engagement portion arranged to protrude in a direction to interfere with a movement of the second engagement portion and engaging with the second engagement portion when the guide member moves forward, the protruding engagement portion being formed by an elastic portion allowing the second engagement portion to move further forward and rearward in the longitudinal direction than the protruding engagement portion when a force larger than a predetermined force is applied from the second engagement portion to the protruding engagement portion, and
   wherein when the guide member moves rearward, the stopper member restricts the third garnish from moving further rearward in the longitudinal direction from a condition where the second engagement portion positioned further forward than the protruding engagement portion is in engagement with the protruding engagement portion.

7. The roof apparatus according to claim 3, wherein the first engagement portion engages with a deflector in accordance with a closing operation of the movable panel and serves as an engagement pin allowing the deflector to be retraced below a surface of the roof portion.

8. The roof apparatus according to claim 4, wherein the first engagement portion engages with a deflector in accordance with a closing operation of the movable panel and serves as an engagement pin allowing the deflector to be retraced below a surface of the roof portion.

9. The roof apparatus according to claim 5, wherein the first engagement portion engages with a deflector in accordance with a closing operation of the movable panel and serves as an engagement pin allowing the deflector to be retraced below a surface of the roof portion.

10. The roof apparatus according to claim 6, wherein the first engagement portion engages with a deflector in accordance with a closing operation of the movable panel and serves as an engagement pin allowing the deflector to be retraced below a surface of the roof portion.

11. The roof apparatus according to claim 1, wherein a rail portion of the guide rail supports the third garnish and includes a pair of guide pieces protruding toward interior and exterior sides, respectively, in a width direction of the vehicle, and
  wherein the third garnish includes upper and lower guide portions extending in the width direction and sandwiching therebetween each of the guide pieces in a vertical direction of the vehicle, first pressure contact portions formed at the upper and lower guide portions, respectively, and facing each other via the guide piece in the vertical direction, and a second pressure contact portion formed at the lower guide portion, and
  wherein the first pressure contact portions of the upper and lower guide portions are pressed in contact with the guide piece, and the second pressure contact portion is pressed in contact with a bottom wall of the rail portion.

12. The roof apparatus according to claim 2, wherein a rail portion of the guide rail supports the third garnish and includes a pair of guide pieces protruding toward interior and exterior sides, respectively, in a width direction of the vehicle, and
  wherein the third garnish includes upper and lower guide portions extending in the width direction and sandwiching therebetween each of the guide pieces in a vertical direction of the vehicle, first pressure contact portions formed at the upper and lower guide portions, respectively, and facing each other via the guide piece in the vertical direction, and a second pressure contact portion formed at the lower guide portion, and
  wherein the first pressure contact portions of the upper and lower guide portions are pressed in contact with the guide piece, and the second pressure contact portion is pressed in contact with a bottom wall of the rail portion.

13. The roof apparatus according to claim 3, wherein a rail portion of the guide rail supports the third garnish and includes a pair of guide pieces protruding toward interior and exterior sides, respectively, in a width direction of the vehicle, and
  wherein the third garnish includes upper and lower guide portions extending in the width direction and sandwiching therebetween each of the guide pieces in a vertical direction of the vehicle, first pressure contact portions formed at the upper and lower guide portions, respectively, and facing each other via the guide piece in the vertical direction, and a second pressure contact portion formed at the lower guide portion, and
  wherein the first pressure contact portions of the upper and lower guide portions are pressed in contact with the guide piece, and the second pressure contact portion is pressed in contact with a bottom wall of the rail portion.

14. The roof apparatus according to claim 4, wherein a rail portion of the guide rail supports the third garnish and includes a pair of guide pieces protruding toward interior and exterior sides, respectively, in a width direction of the vehicle, and
  wherein the third garnish includes upper and lower guide portions extending in the width direction and sandwiching therebetween each of the guide pieces in a vertical direction of the vehicle, first pressure contact portions formed at the upper and lower guide portions, respectively, and facing each other via the guide piece in the vertical direction, and a second pressure contact portion formed at the lower guide portion, and
  wherein the first pressure contact portions of the upper and lower guide portions are pressed in contact with the guide piece, and the second pressure contact portion is pressed in contact with a bottom wall of the rail portion.

15. The roof apparatus according to claim 5, wherein a rail portion of the guide rail supports the third garnish and includes a pair of guide pieces protruding toward interior and exterior sides, respectively, in a width direction of the vehicle, and
  wherein the third garnish includes upper and lower guide portions extending in the width direction and sandwiching therebetween each of the guide pieces in a vertical direction of the vehicle, first pressure contact portions formed at the upper and lower guide portions, respectively, and facing each other via the guide piece in the vertical direction, and a second pressure contact portion formed at the lower guide portion, and
  wherein the first pressure contact portions of the upper and lower guide portions are pressed in contact with the guide piece, and the second pressure contact portion is pressed in contact with a bottom wall of the rail portion.

16. The roof apparatus according to claim 6, wherein a rail portion of the guide rail supports the third garnish and includes a pair of guide pieces protruding toward interior and exterior sides, respectively, in a width direction of the vehicle, and
  wherein the third garnish includes upper and lower guide portions extending in the width direction and sandwiching therebetween each of the guide pieces in a vertical direction of the vehicle, first pressure contact portions formed at the upper and lower guide portions, respectively, and facing each other via the guide piece in the vertical direction, and a second pressure contact portion formed at the lower guide portion, and
  wherein the first pressure contact portions of the upper and lower guide portions are pressed in contact with the guide piece, and the second pressure contact portion is pressed in contact with a bottom wall of the rail portion.

17. The roof apparatus according to claim 7, wherein a rail portion of the guide rail supports the third garnish and includes a pair of guide pieces protruding toward interior and exterior sides, respectively, in a width direction of the vehicle, and
  wherein the third garnish includes upper and lower guide portions extending in the width direction and sandwiching therebetween each of the guide pieces in a vertical direction of the vehicle, first pressure contact portions formed at the upper and lower guide portions, respectively, and facing each other via the guide piece in the vertical direction, and a second pressure contact portion formed at the lower guide portion, and
  wherein the first pressure contact portions of the upper and lower guide portions are pressed in contact with the guide piece, and the second pressure contact portion is pressed in contact with a bottom wall of the rail portion.

18. The roof apparatus according to claim 8, wherein a rail portion of the guide rail supports the third garnish and includes a pair of guide pieces protruding toward interior and exterior sides, respectively, in a width direction of the vehicle, and wherein the third garnish includes upper and lower guide portions extending in the width direction and sandwiching therebetween each of the guide pieces in a vertical direction of the vehicle, first pressure contact portions formed at the upper and lower guide portions, respectively, and facing each other via the guide piece in the vertical direction, and a second pressure contact portion formed at the lower guide portion, and wherein the first pressure contact portions of the upper and lower guide portions are pressed in contact with the guide piece, and the second pressure contact portion is pressed in contact with a bottom wall of the rail portion.

19. The roof apparatus according to claim 9, wherein a rail portion of the guide rail supports the third garnish and includes a pair of guide pieces protruding toward interior and exterior sides, respectively, in a width direction of the vehicle, and wherein the third garnish includes upper and lower guide portions extending in the width direction and sandwiching therebetween each of the guide pieces in a vertical direction of the vehicle, first pressure contact portions formed at the upper and lower guide portions, respectively, and facing each other via the guide piece in the vertical direction, and a second pressure contact portion formed at the lower guide portion, and wherein the first pressure contact portions of the upper and lower guide portions are pressed in contact with the guide piece, and the second pressure contact portion is pressed in contact with a bottom wall of the rail portion.

20. The roof apparatus according to claim 10, wherein a rail portion of the guide rail supports the third garnish and includes a pair of guide pieces protruding toward interior and exterior sides, respectively, in a width direction of the vehicle, and wherein the third garnish includes upper and lower guide portions extending in the width direction and sandwiching therebetween each of the guide pieces in a vertical direction of the vehicle, first pressure contact portions formed at the upper and lower guide portions, respectively, and facing each other via the guide piece in the vertical direction, and a second pressure contact portion formed at the lower guide portion, and wherein the first pressure contact portions of the upper and lower guide portions are pressed in contact with the guide piece, and the second pressure contact portion is pressed in contact with a bottom wall of the rail portion.

* * * * *